(12) United States Patent
Garrard

(10) Patent No.: US 12,734,935 B2
(45) Date of Patent: Sep. 15, 2026

(54) ELECTRIC VEHICLE POWERTRAIN CONTROLLER

(71) Applicant: BorgWarner Inc., Auburn Hills, MI (US)

(72) Inventor: Tyler R. Garrard, Arden, NC (US)

(73) Assignee: BorgWarner Inc., Auburn Hills, MI (US)

( * ) Notice: Subject to any disclaimer, the term of this patent is extended or adjusted under 35 U.S.C. 154(b) by 496 days.

(21) Appl. No.: 18/123,032

(22) Filed: Mar. 17, 2023

(65) Prior Publication Data

US 2024/0308390 A1 Sep. 19, 2024

(51) Int. Cl.

*B60L 58/26* (2019.01)
*B60L 50/16* (2019.01)
*B60L 50/51* (2019.01)

(52) U.S. Cl.

CPC ............... *B60L 58/26* (2019.02); *B60L 50/16* (2019.02); *B60L 50/51* (2019.02); *B60L 2210/10* (2013.01); *B60L 2210/40* (2013.01); *B60L 2240/40* (2013.01)

(58) Field of Classification Search

None
See application file for complete search history.

(56) References Cited

U.S. PATENT DOCUMENTS 11,571,982 B1 * 2/2023 Tyne ........................ B60L 53/11
2005/0259370 A1 * 11/2005 Kubo ..................... G01R 31/52 361/42
2008/0054647 A1 * 3/2008 Kumar .................. F02D 41/042 290/40 R
2008/0277175 A1 * 11/2008 Tyler ....................... B60L 58/33 320/101
2018/0319409 A1 * 11/2018 Jalla .......................... H02P 6/10
2022/0080834 A1 * 3/2022 Edlabadkar ............... B60L 7/14
2024/0217516 A1 * 7/2024 Sommansson .......... B60L 58/15

OTHER PUBLICATIONS

CN Office Action for CN Application No. 202420507756.4 dated Aug. 19, 2024 (1 page).

* cited by examiner

*Primary Examiner* — James J Lee
*Assistant Examiner* — Melanie G Huber
(74) *Attorney, Agent, or Firm* — Reising Ethington P.C.

(57) ABSTRACT

A powertrain controller for an electric vehicle (EV) includes a compressor controller configured to regulate three-phases of electrical current supplied by a vehicle battery of the EV or an electric motor of the EV to an electrically-actuated compressor; and a load bank controller configured to regulate a fourth-phase of electrical current provided by the vehicle battery or the electric motor of the EV to a resistive load bank, such that the compressor controller and the load bank controller are integrated into a common control system.

14 Claims, 7 Drawing Sheets

ELECTRIC VEHICLE POWERTRAIN CONTROLLER

TECHNICAL FIELD

The present application relates to electric powertrain controllers and, more particularly, to controllers used with electric vehicles (EVs).

BACKGROUND

Modern vehicles are increasingly propelled by an electric motor receiving electrical power from any one of a variety of energy sources. Rather than relying solely on an internal combustion engine (ICE) for propulsion, vehicles now may primarily use an electric motor to move the EV. The vehicle may include one or more different energy sources that can be called on to supply electrical power to the electric motor. For instance, the vehicle could include a battery, a fuel cell, and/or an ICE that is in electrical communication with the electric motor supplying it with electrical current that is regulated by power control electronics. The power control electronics can regulate the electrical power it receives and invert it for use with the electric motor of the vehicle.

While the vehicle is coasting, the electric motor can recuperate electrical power that may be used to charge an energy storage system of the vehicle. Additionally, the vehicle can include a resistive load, in electrical communication with the power control electronics, that receives excess electrical current generated by the electric motor as the vehicle coasts. The flow of electrical current into the resistive load can generate a significant amount of heat that can be dissipated in a variety of ways, such as using a fan moving ambient air over the resistive bank.

SUMMARY

In one implementation, a powertrain controller for an electric vehicle (EV) includes a compressor controller configured to regulate three-phases of electrical current supplied by a vehicle battery of the EV or an electric motor of the EV to an electrically-actuated compressor; and a load bank controller configured to regulate a fourth-phase of electrical current provided by the vehicle battery or the electric motor of the EV to a resistive load bank, such that the compressor controller and the load bank controller are integrated into a common control system.

In another implementation, a powertrain controller for an EV, includes a compressor controller, configured to electrically couple with an electrically-actuated compressor, that regulates electrical current supplied by a vehicle battery of the EV or an electric motor of the EV to the electrically-actuated compressor; and a load bank controller configured to regulate electrical current provided by the vehicle battery or the electric motor of the EV to a resistive load bank, wherein the compressor controller and the load bank controller are both within a powertrain controller housing.

In yet another implementation, a powertrain controller for an EV includes an electrically-actuated compressor electrically connected to a control system of the powertrain controller; a resistive load bank, including a plurality of resistors electrically connected together, that is electrically connected to the control system of the powertrain controller; and a resistor housing that receives the resistive load bank and is in fluid communication with the compressor portion of the electrically-actuated compressor that cools the resistors, such that the control system is configured to receive electrical current from a vehicle battery or an electric motor used by the EV for propulsion and provide three-phase electrical current to the electrically-actuated compressor and a fourth-phase of electrical current to the resistive load bank.

DETAILED DESCRIPTION

An electric vehicle (EV) can include one or more electric motors that propel the vehicle and one or more electrical power sources that supply the electric motor with electrical current, as well as a powertrain controller that regulates the supply of the electrical current. Apart from the electric motor(s), the EV can also include features that manage the energy of the vehicle. For example, the EV can include resistive load bank, comprising an array of electrical resistor elements, that can receive excess electrical current under certain conditions. A byproduct of the receipt of this electrical current through the resistive load bank is heat, which can be managed using an electrically-actuated compressor.

In the past, EVs have used relatively large resistive banks positioned at the front of the EV where the banks can be cooled using air flow generated through movement of the vehicle, much like the radiator used by a vehicle powered with an internal combustion engine. However, these past implementations involve positioning the resistive bank at the front of the vehicle thereby limiting the shapes of vehicles and use of space within vehicles. The frontal area used by past air cooled load banks may often exceed the normal cooling capacity of the vehicle by two to five times.

The electrically-actuated compressor can be actuated and controlled using the powertrain controller, which regulates a supply of electrical current to an electric motor within the compressor housing turning a compressor wheel that pumps compressed air over the electrical resistor elements. The powertrain controller can be electrically connected to the resistive load bank, as well as the electrically-actuated compressor, and include switches, such as MOSFETs or IGBTs, that invert electrical energy stored in a vehicle battery thereby controlling three-phase electrical current supplied to the electrically-actuated compressor. The powertrain controller can also include an additional group of switches, implementing a fourth phase, apart from the switches that regulate the AC electrical current supplied to the compressor, that regulate the flow of electrical current from one or more electrical motors of the EV to the resistive load bank. In that sense, the powertrain controller can regulate both the electrical current supplied to the electrically-actuated compressor and the electrical current supplied to the resistive load bank from the electrical motor(s) of the EV in one controller.

Figure 1:
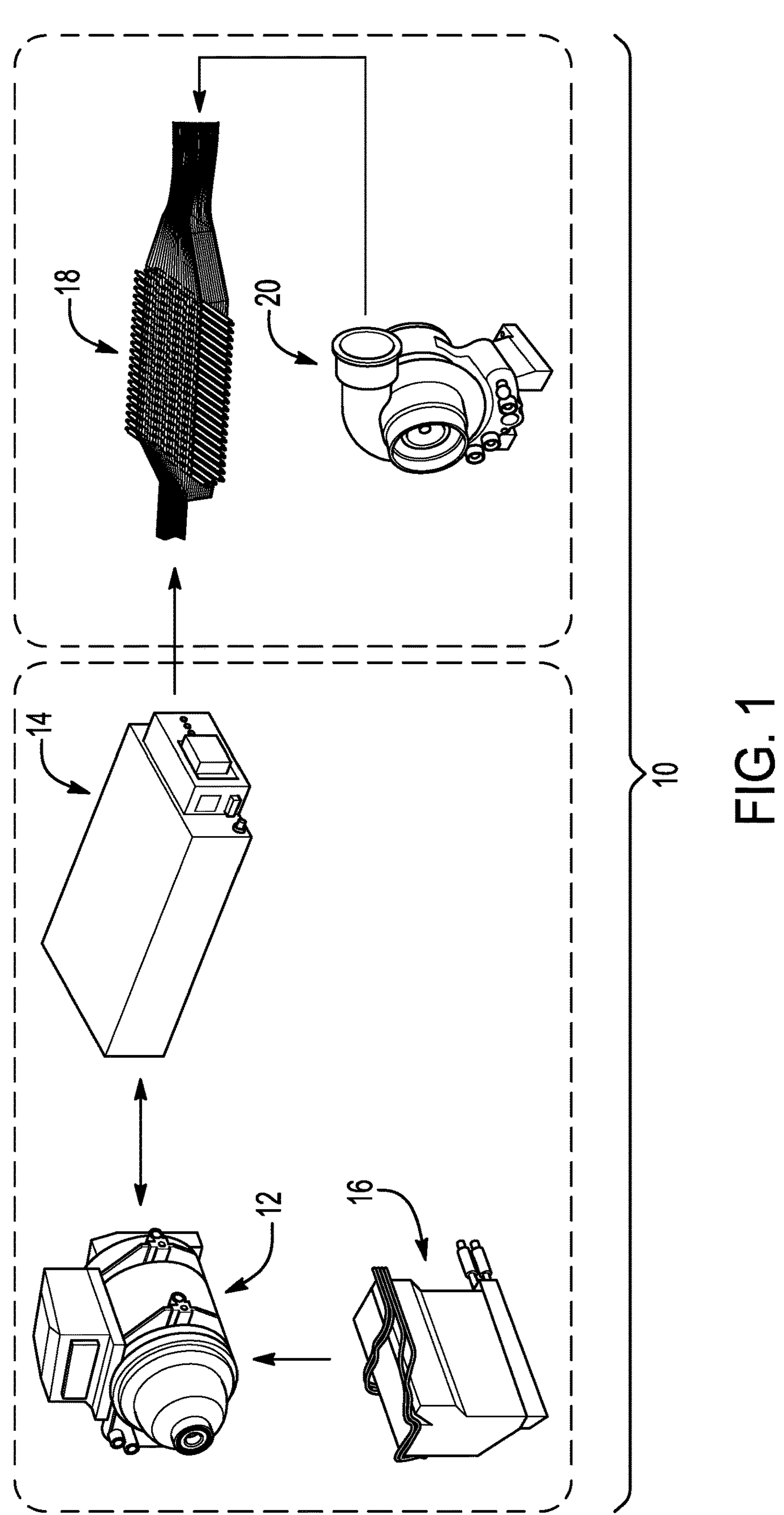
FIG. 1 is a block diagram depicting an implementation of an electric vehicle (EV)
Figure 2:
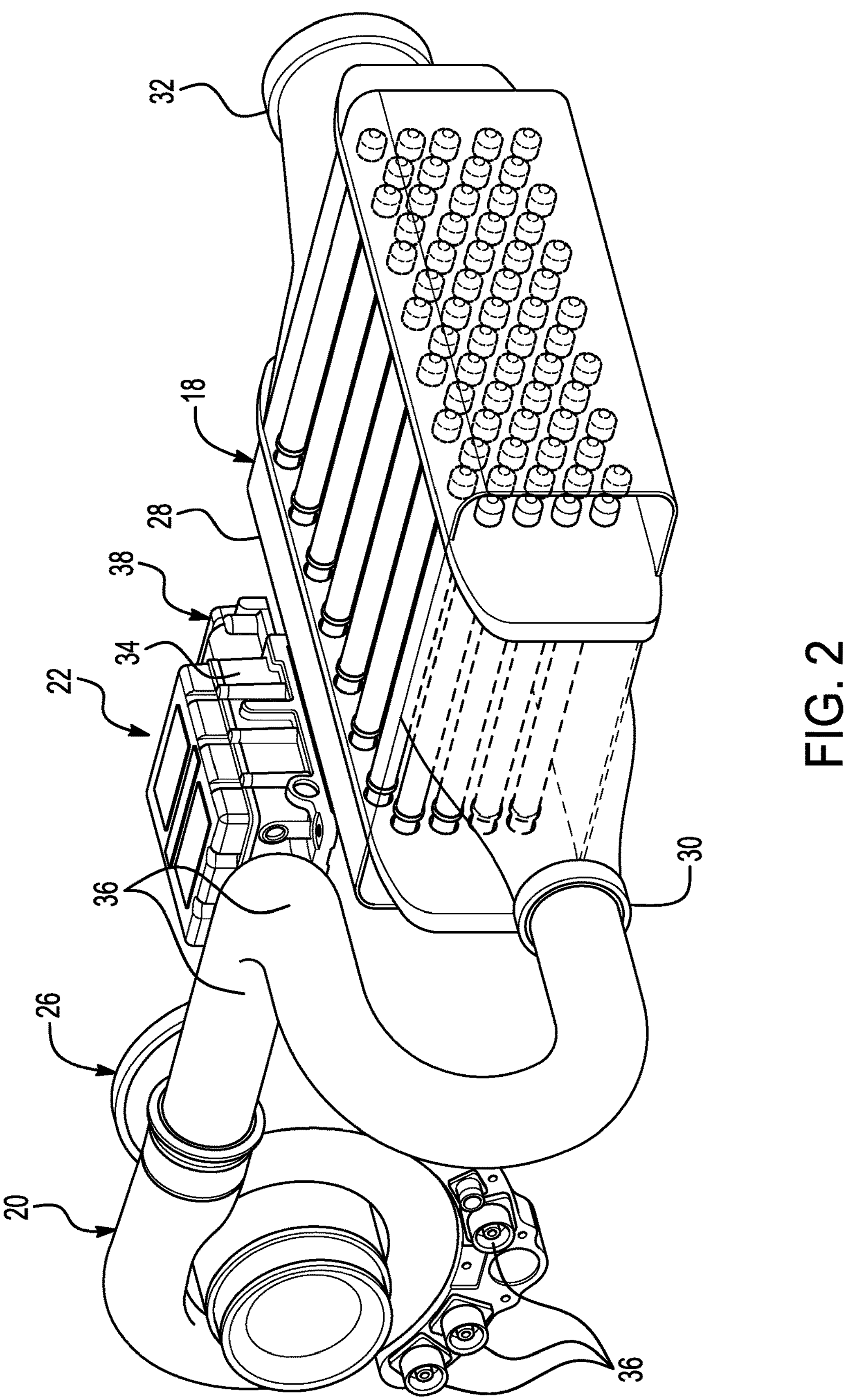
FIG. 2 is a perspective view depicting an implementation of a portion of an EV.

Turning to FIG. 1, an implementation of an electric vehicle (EV) 10 is shown. In this implementation, the EV can include at least one electric motor 12, a vehicle battery 14 supplying electrical power to the electric motor 12 that propels the EV 10, a fuel cell 16 that supplies electrical power to the electric motor 12 or vehicle battery 14, a resistive load bank 18 that receives excess electrical current from the electric motor 12, an electrically-actuated compressor 20 that cools the resistive load bank 18, and a powertrain controller 22 that both regulates electrical current supplied to the electrically-actuated compressor 20 as well as electrical current supplied to the resistive load bank 18.

The term "EV" can refer to vehicles that are propelled, either wholly or partially, by electric motors. EV can refer to fuel cell vehicles, electric vehicles, plug-in electric vehicles, hybrid electric vehicles, or battery-powered vehicles. The EV 10 can be a passenger vehicle or a commercial vehicle intended to transport goods and/or people. The electric motor(s) 12 can be implemented in any one of a variety of different ways. For example, the electric motor 12 can be a traction motor coupled with a transmission that communicates the rotational energy of the motor to the wheels of the EV 10. The vehicle battery 14 or batteries are rechargeable and can include lead-acid batteries, nickel cadmium (NiCd), nickel metal hydride, lithium-ion, or lithium polymer batteries. A typical range of vehicle battery voltages can range from 200 to 800V or more of DC electrical power (VDC). In this implementation of the EV 10, the electric motor 12 can receive electrical current from the vehicle battery 14 or the fuel cell 16, but other implementations of EVs are possible on which the electric motor is solely powered with a vehicle battery. Fuel cells are known and convert a fuel, such as hydrogen, into electrical current as part of a chemical reaction, yielding a byproduct, such as water. However, unlike the vehicle battery 14, the fuel cell 16 is unable to receive DC electrical current from the EV 10.

An electrically-actuated compressor 20 includes a compressor portion 24 and an electric motor portion 26. This implementation can sometimes be referred to as an electric supercharger because forced induction in this implementation relies solely on the rotational force provided by an electric motor rather than also using an exhaust turbine that is rotationally driven by exhaust gases as is common with turbocharging techniques. A compressor shaft (not shown) extends through the compressor portion 24 and the electric motor portion 26. At one end, the compressor shaft couples with a compressor, located in the compressor portion, that spins to compress air, which is ultimately supplied to a housing that includes the resistive load bank 18. The compressed air flows through the housing and dissipates heat generated by the resistive load bank as electrical current flows through the resistors. Another portion of the compressor shaft that is axially-spaced from the compressor and located in the electric motor portion 22 couples with a rotor assembly of an electric motor. The powertrain controller 22 can be electrically connected to the electrically-actuated compressor 20, the electric motor 12 of the EV 10, the vehicle battery 14, and the resistive load bank 18.

In one implementation, the electric motor portion 26 can be implemented as a brushless motor that is powered using DC voltage from the vehicle battery 14. The power of the electric motor turning the compressor and included in the electric motor portion 26 can be above 1 kW. Electrical connectors are included on the electrically actuated compressor 20 and communicate electrical power from the vehicle battery 14 to the compressor 20 through the powertrain controller 22, which regulates electrical current supplied to the electric motor of the electrically-actuated compressor 20. A power cable electrically connects the vehicle battery 14 to the powertrain controller and electrical connectors electrically connect the powertrain controller 22 to the electrically-actuated compressor 20 and the resistive load bank 18.

The resistive load bank 18 can include a plurality of resistors electrically connected in parallel and/or series. The overall electrical resistance of the resistive load bank 18 can vary and be specified by particular applications. But in one implementation, the resistive load bank 18 can have a resistance greater than 200 kW. The resistors can be positioned within a resistor housing 28 having an inlet 30 and an exhaust outlet 32. A pair of input terminals can electrically connect the resistive load bank 18 to the powertrain controller 22. The resistive load bank 18 can be mounted in any one of a number of locations on the EV 10 such that the inlet 30 of the bank 18 is in fluid communication with the electrically-actuated compressor 20. In the past, resistive load banks have been mounted toward the front of a vehicle such that an electrically or mechanically-driven fan and oncoming airflow from vehicle motion cooled the resistors. However, in the present implementation, the resistive load bank 18 is cooled by the electrically-actuated compressor 20 such that a sufficient flow of air over the resistors permits a greater degree of freedom with respect to the location where the bank 18 is mounted. The electrically-actuated compressor 20 can compress air into the inlet 30 of the resistor housing 28 to create a sufficient level of flow across the outer surfaces of the resistors thereby dissipating heat and carrying it out the exhaust outlet 32.

Figures 4, 5:
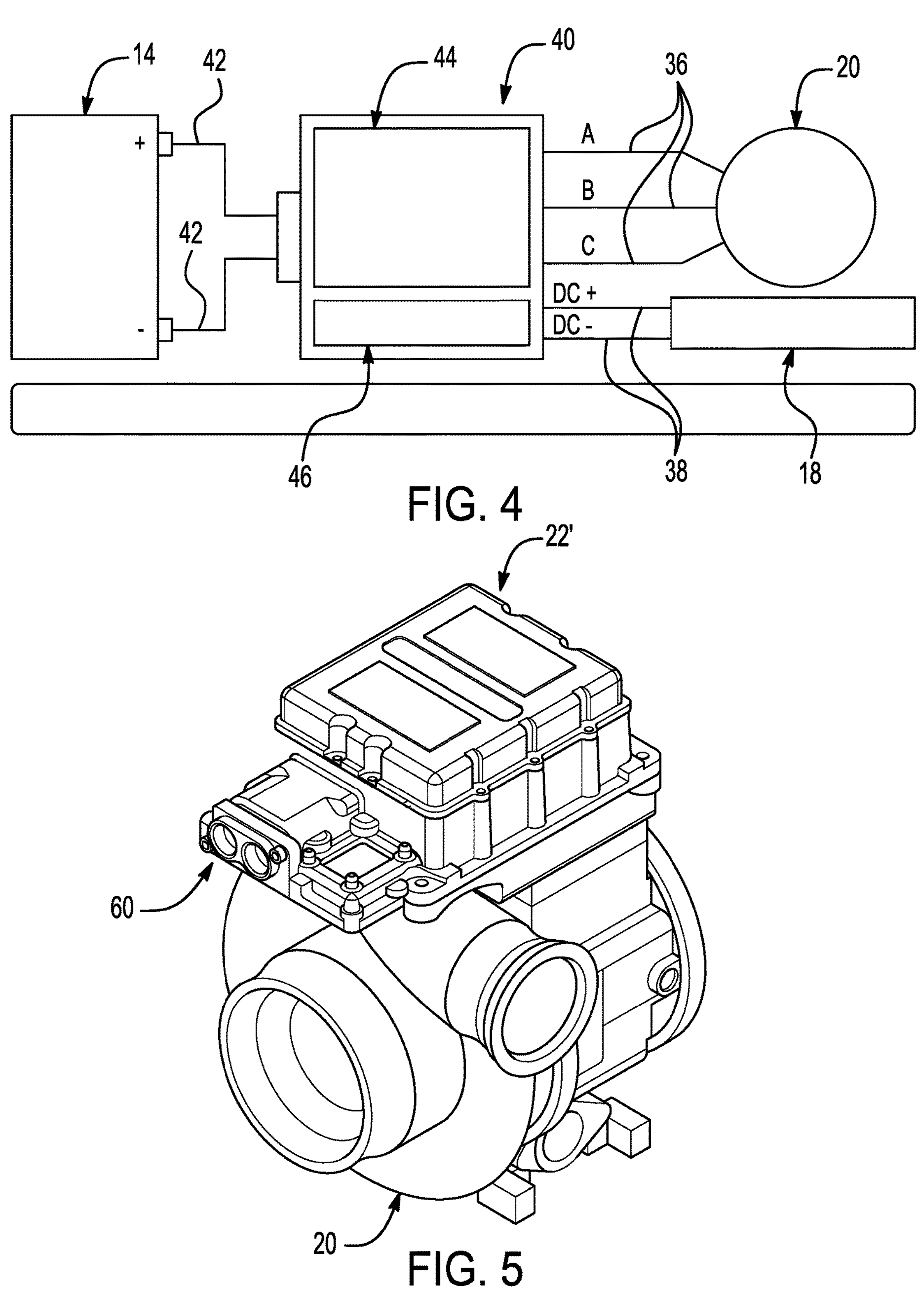
FIG. 4 is a block diagram depicting an implementation of a control system implemented by a powertrain controller used by an EV.
FIG. 5 is a perspective view depicting another implementation of a portion of an EV.
Figure 6:
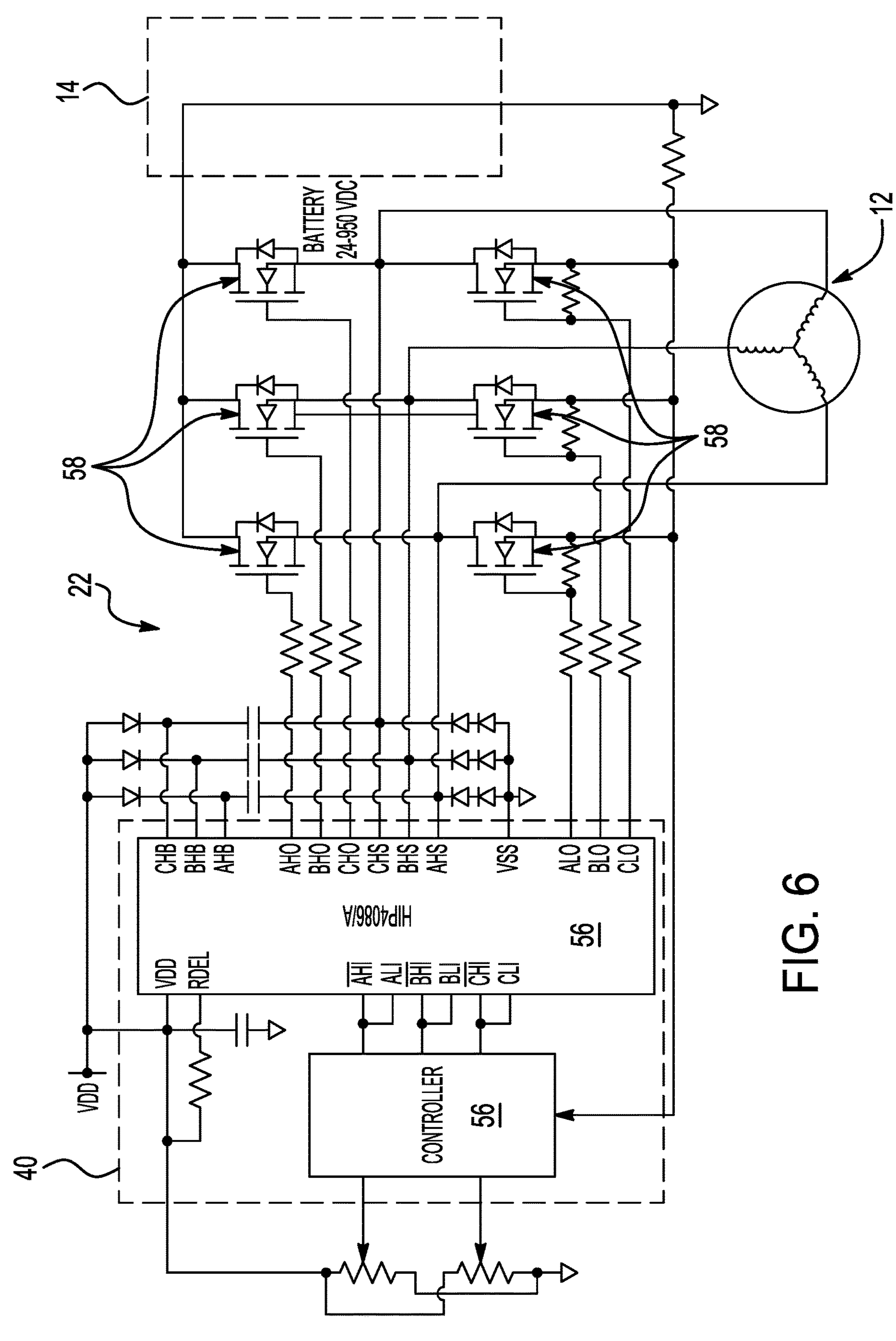
FIG. 6 is a circuit diagram depicting an implementation of a powertrain controller implemented by an EV.
Figure 7:
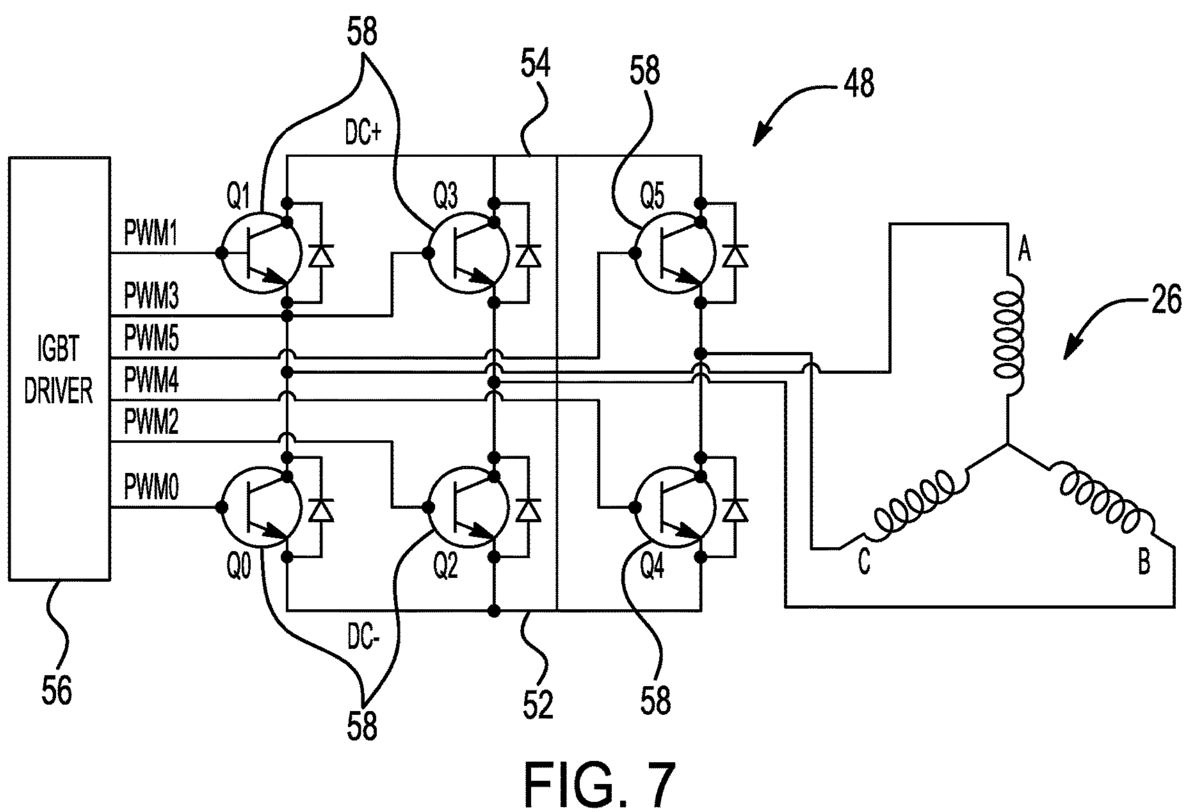
FIG. 7 is a circuit diagram depicting an implementation of a portion of the powertrain controller implemented by an EV.
Figure 8:
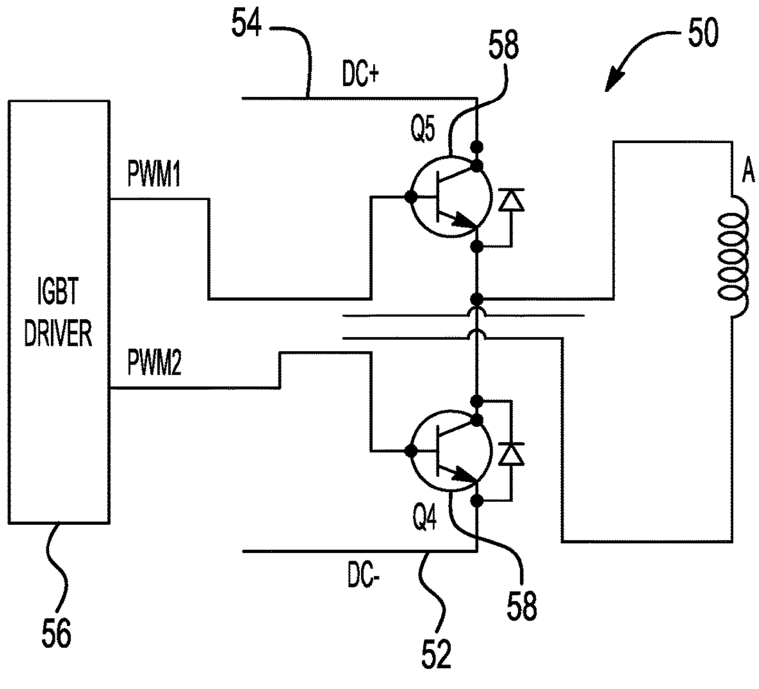
FIG. 8 is a circuit diagram depicting an implementation of another portion of the powertrain controller implemented by an EV.
Figure 9:
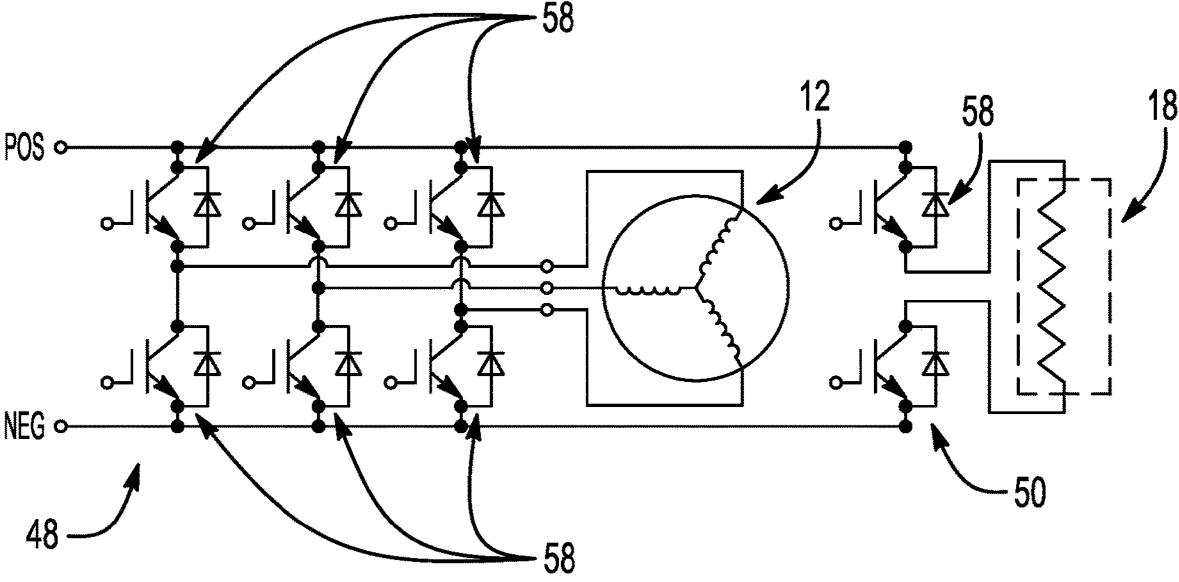
FIG. 9 is a circuit diagram depicting another implementation of a portion of the powertrain controller implemented by an EV.

The powertrain controller 22 can be mounted in a location that is remote from the electrically-actuated compressor 20 or in other implementations the powertrain controller 22 can be included with the compressor 20 in a common assembly as is shown in FIG. 4. The powertrain controller 22 includes a powertrain controller housing 34, a printed circuit board (PCB), and a plurality of electrical switches and electrical components that carry out regulation of electrical current to the electrically-actuated compressor 20 as well as the resistive load bank 18. Electrical input terminals 38 can receive electrical current from the vehicle battery 14. The powertrain controller 22 can also include three terminals 36 that electrically couple to the electrically-actuated compressor 20.

The electrical switches can be implemented as MOSFETs that are commonly used to invert DC electrical power into electrical current that commutates a rotor relative to a stator in a traction motor. However, other types of switches may be possible. And with respect to electrical components, this should be understood to include microprocessors, capacitors, resistors, and inductors commonly used to implement modern control systems and power electronics as understood by those skilled in the art. Any one of a number of microprocessors are possible. For instance, the microprocessor, such as an electronic control unit (ECU), can be any type of device capable of processing electronic instructions including microprocessors, microcontrollers, host processors, controllers, vehicle communication processors, and application specific integrated circuits (ASICs). It can be a dedicated processor used only to carry out the described control system or can be shared with other vehicle systems. The microprocessor executes various types of digitally-stored instructions, such as software or firmware programs stored in memory.

The PCB, electrical switches, and electrical components can bidirectionally communicate electrical current between the vehicle battery 14 and the electric motor 12 of the EV 10, supply electrical current to the electrically-actuated compressor 20, as well as selectively directing electrical current into the resistive load bank 18. The housing 34 can be formed from a material that is resistant to heat and sufficiently resilient so that it protects the PCB and electrical components included within. Openings in the housing 34 can permit electrical connections to extend from within the housing 34 to components outside the housing 34, such as the vehicle battery 14, the electrically-actuated compressor 20, or the electric motor 12 of the EV 10.

Figure 3:
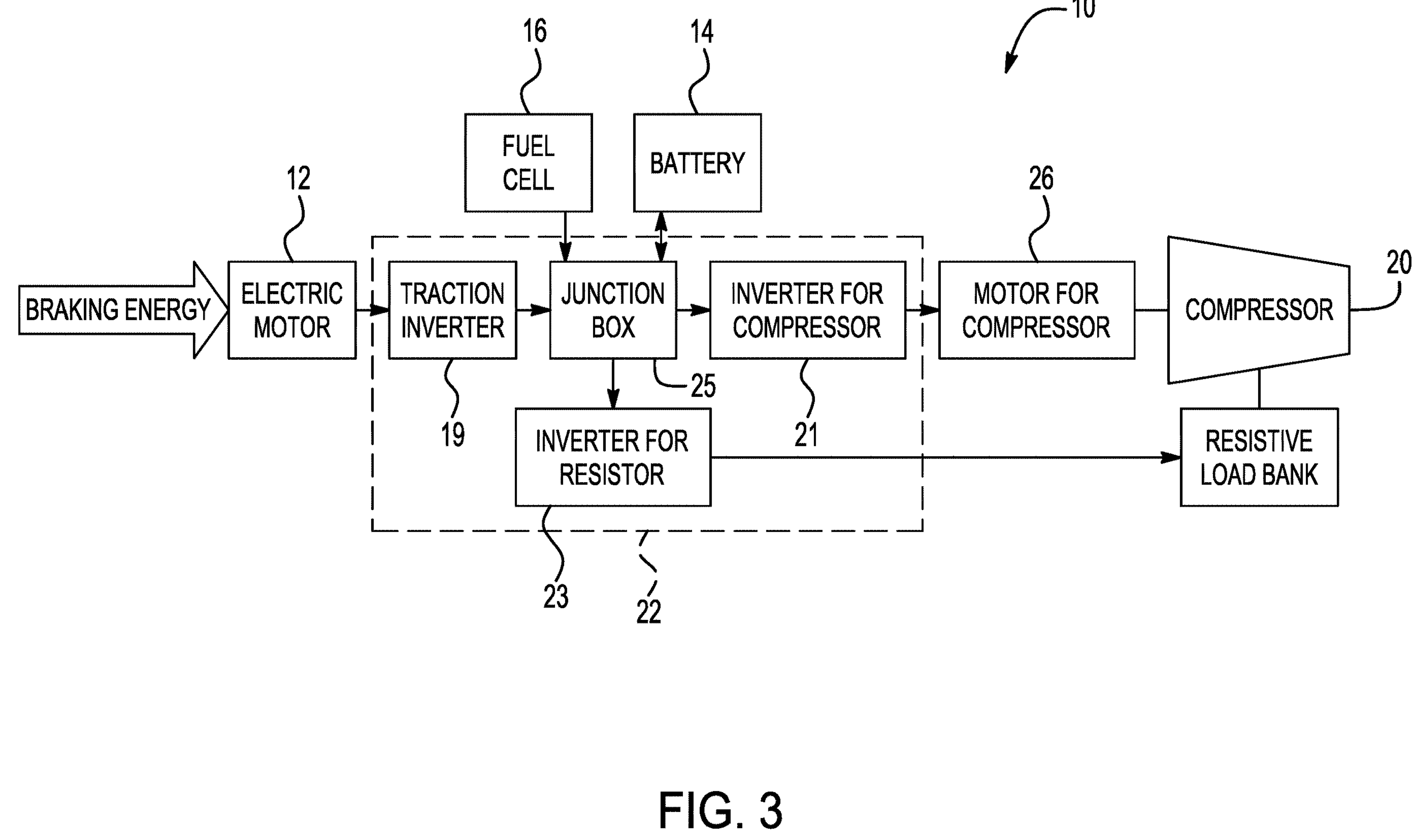
FIG. 3 is a block diagram depicting an implementation of a portion of an EV.

As shown in FIG. 3, the EV 10 can receive braking energy at the electric motor 12. The motion of the EV 10 can be converted to AC electrical power by the electric motor. The AC electrical power can then be supplied to the powertrain controller 22. The powertrain controller 22 can include electrical components that implement a traction inverter 19 for the electric motor 12, a compressor inverter 21 for the compressor 20, a resistor chopper controller 23 for the resistive load bank 18, and a junction box 25 comprising a plurality of switches for selectively providing electrical power to the vehicle battery 14, the compressor 20, or the resistive load bank 18. If the state of charge of the vehicle battery 14 is above a particular level, the junction box 25 can direct electrical power to the compressor 20 and/or the resistive load bank 18 through the inverter 21 or resistor chopper controller 23.

Turning to FIG. 4, an implementation of a control system 40 used by the powertrain controller 22 is shown. The control system 40 includes electrical connections 42 to input terminals that carry electrical current between the system 40 and the vehicle battery 14. The control system 40 also includes three electrical terminals 36 that electrically connect with the electrically-actuated compressor 20 as well as two resistor terminals 38 that electrically connect to the resistive load bank 18. The control system 40 can include a compressor controller 44 and a load bank controller 46. The compressor controller 44 can include a three-phase DC motor controller for regulating electrical current supplied to the electrically-actuated compressor 20. The three-phase controller can be implemented using six MOSFET switches each electrically connected via a gate to a microcontroller including computer-readable instructions for motor control. In addition to the compressor controller 44, the control system can include the load bank controller 46 regulating a fourth phase. The load bank controller 46 can be implemented using a DC chopper circuit that generates a single-phase output selectively communicated to the resistive load bank 18. The DC chopper circuit can be implemented using a MOSFET switch to regulate a fixed DC voltage received at the input terminals into a varying DC voltage applied to the resistive load bank. There are a variety of control strategies for regulating these switches. But ultimately, the control system 40 integrates both the compressor controller 44 and the load bank controller 46 as one unified system within the motor controller.

FIG. 5 depicts another implementation of a powertrain controller 22' as it is combined with the electrically-actuated compressor 20. In this implementation, the powertrain controller 22' is directly coupled to the electrically-actuated compressor 20. The intake from the compressor portion 24 can have an intake flow of air that is substantially colinear with a DC electrical connection 60 of the powertrain controller 22'. That is, an electrical connection between the powertrain controller 22' and the resistive load bank 18 could be pressed into mechanical engagement with the DC electrical connection 60 in the same direction that air flows into the compressor portion 24 of the electrically-actuated compressor 20. Alternatively, in another implementation, the intake from the compressor portion 24 can have an intake flow of air that is substantially colinear with a DC electrical connection 60 of the powertrain controller 22' but in a direction that is 180 degrees from (in opposition to) the intake of the compressor portion 24.

FIGS. 6-9 depict an implementation of the powertrain controller 22. The powertrain controller 22 can include a three-phase motor controller 48 used to regulate electrical current to the electric motor 12 along with a DC chopper circuit 50 that is electrically connected to the resistive load bank 18 via a DC negative 52 and a DC positive 54 connection. The control system 40 can be implemented using microprocessors 56 that are electrically connected to switches 58 implemented as MOSFETs. The powertrain controller 22 integrates the three-phase motor controller 48 and the DC chopper circuit 50 into one package that can be included within the powertrain controller housing 34. The integrated powertrain controller 22 including both the three-phase motor controller 48 and the DC chopper circuit 50 can include common electrical components that are shared by both the controller 48 and circuit 50 rather than previous implementations in which a motor controller and a chopper circuit were separate structures. For example, the three-phase motor controller 48 and the DC chopper circuit 50 can share a DC high-voltage interlock (HVIL) connector, an EMI-EMC filter assembly, bulk capacitance, one or more microprocessors, a CAN transceiver, a driver board, MOSFET switches, current sensors, and I/Os.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A powertrain controller for an electric vehicle (EV), comprising:

a compressor controller configured to regulate three-phases of electrical current supplied by a vehicle battery of the EV or an electric motor of the EV to an electrically-actuated compressor; and a load bank controller configured to regulate a fourth-phase of electrical current provided by the vehicle battery or the electric motor of the EV to a resistive load bank, wherein the compressor controller and the load bank controller are integrated into a common control system.

2. The powertrain controller recited in claim 1, wherein the compressor controller controls a three-phase motor controller and the load bank controller controls a DC chopper circuit.

3. The powertrain controller recited in claim 2, wherein the DC chopper circuit and the three-phase motor controller are implemented with six switches.

4. The powertrain controller recited in claim 1, further comprising electrical connections from the powertrain controller to the resistive load bank.

5. The powertrain controller recited in claim 1, wherein the compressor controller and the load bank controller are both within a powertrain controller housing.

6. A powertrain controller for an electric vehicle (EV), comprising:

a compressor controller, configured to electrically couple with an electrically-actuated compressor, that regulates three-phases of electrical current supplied by a vehicle battery of the EV or an electric motor of the EV to the electrically-actuated compressor; and a load bank controller configured to regulate a fourth phase of electrical current provided by the vehicle battery or the electric motor of the EV to a resistive load bank, wherein the compressor controller and the load bank controller are both within a powertrain controller housing.

7. The powertrain controller recited in claim 6, wherein the compressor controller controls a three-phase motor controller and the load bank controller controls a DC chopper circuit.

8. The powertrain controller recited in claim 7, wherein the DC chopper circuit and the three-phase motor controller are implemented with at least six switches.

9. The powertrain controller recited in claim 6, further comprising electrical connections from the powertrain controller to the resistive load bank.

10. A powertrain controller for an electric vehicle (EV), comprising:

an electrically-actuated compressor electrically connected to a control system of the powertrain controller;

a resistive load bank, including a plurality of resistors electrically connected together, that is electrically connected to the control system of the powertrain controller; and a resistor housing that receives the resistive load bank and is in fluid communication with the compressor portion of the electrically-actuated compressor that cools the resistors, wherein the control system is configured to receive electrical current from a vehicle battery or an electric motor used by the EV for propulsion and provide three-phase electrical current to the electrically-actuated compressor and a fourth-phase of electrical current to the resistive load bank.

11. The powertrain controller recited in claim 10, wherein the control system includes a three-phase motor controller and a DC chopper circuit.

12. The powertrain controller recited in claim 11, wherein the DC chopper circuit and the three-phase motor controller are implemented with at least six switches.

13. The powertrain controller recited in claim 10, further comprising electrical connections from the powertrain controller to the resistive load bank and the electrically-actuated compressor.

14. A powertrain controller for an electric vehicle (EV), comprising:

a compressor controller configured to regulate three-phase alternating current (AC) electrical current to an electrically-actuated compressor; and a load bank controller including a DC chopper circuit configured to regulate a fourth-phase of electrical current provided to a resistive load bank, wherein the compressor controller and the load bank controller are integrated into a common enclosure and share at least some electrical components.

* * * * *